United States Patent
Murase

(10) Patent No.: US 8,159,703 B2
(45) Date of Patent: Apr. 17, 2012

(54) INFORMATION PROCESSING APPARATUS, AND CONTROL METHOD THEREFOR, AS WELL AS PROGRAM

(75) Inventor: Yoko Murase, Yokohama (JP)

(73) Assignee: Canon Kabushiki Kaisha (JP)

( * ) Notice: Subject to any disclaimer, the term of this patent is extended or adjusted under 35 U.S.C. 154(b) by 811 days.

(21) Appl. No.: 12/103,221

(22) Filed: Apr. 15, 2008

(65) Prior Publication Data

US 2008/0259390 A1    Oct. 23, 2008

(30) Foreign Application Priority Data

Apr. 17, 2007    (JP) .................................. 2007-108181

(51) Int. Cl.
G06F 3/12 (2006.01)
G06F 15/16 (2006.01)
G06F 3/00 (2006.01)
G06K 15/00 (2006.01)

(52) U.S. Cl. ...... 358/1.15; 358/1.1; 358/1.13; 358/1.14; 709/203; 715/743

(58) Field of Classification Search .................. 358/1.15, 358/1.16, 1.14, 1.13, 1.1; 709/220; 719/321
See application file for complete search history.

(56) References Cited

U.S. PATENT DOCUMENTS

| | | | | |
|---|---|---|---|---|
| 6,148,346 A * | 11/2000 | Hanson | ......................... | 719/321 |
| 7,167,257 B2 * | 1/2007 | Matsuda | ..................... | 358/1.15 |
| 7,180,612 B2 * | 2/2007 | Shimizu | ...................... | 358/1.13 |
| 7,619,765 B2 * | 11/2009 | Kimura et al. | .............. | 358/1.15 |
| 7,809,807 B2 * | 10/2010 | Tominaga | ..................... | 709/220 |
| 2006/0221370 A1 * | 10/2006 | Iida | .............................. | 358/1.13 |

FOREIGN PATENT DOCUMENTS

JP     2000-187573 A    7/2000

* cited by examiner

Primary Examiner — Charlotte M Baker
Assistant Examiner — Rury Grisham
(74) Attorney, Agent, or Firm — Rossi, Kimms & McDowell LLP

(57) ABSTRACT

An information processing apparatus which makes it possible to improve user operability in selecting a desired one from a plurality of image processing apparatuses by selecting functions of the image processing apparatuses. A virtual printer driver acquires function information on a plurality of printers existing on a network. One printer is selected as a default printer from the printers. Configuration items associated with functions of the default printer, and configuration items associated with functions of the other printers are displayed on a configuration screen in a manner selectable by a user. The configuration items associated with the functions of the printers except the default printer are displayed such that a printer equipped with a function associated with each of the configuration items can be identified by the user. Print data is transmitted to one of the printers, based on a configuration item selected by the user.

17 Claims, 15 Drawing Sheets

FIG. 5

| PRINTER NAME | | XXX |
|---|---|---|
| LOCATION | | YYY |
| STATUS | | ZZZ |
| FUNCTION INFORMATION | COLOR | × |
| | DOUBLE-SIDED | ○ |
| | SHEET SIZE A3 | × |
| | 2in1 | × |
| | BOOKBINDING | × |

FIG. 6

|  | PRINTER 103 | PRINTER 104 | PRINTER 105 |
|---|---|---|---|
| DEFAULT | ○ | × | × |
| MONOCHROME/COLOR | MONOCHROME | COLOR | COLOR |
| SHEET SIZE A3 | × | ○ | × |
| DOUBLE-SIDED | ○ | ○ | ○ |
| 2in1 | × | ○ | ○ |
| BOOKBINDING | × | × | ○ |

FIG. 14

|  | PRINTER 103 | PRINTER 104 | PRINTER 105 |
|---|---|---|---|
| COLOR PRINTING | ○ | × | ○ |
| DOUBLE-SIDED PRINTING | × | ○ | ○ |
| STAPLING | × | ○ | × |

INFORMATION PROCESSING APPARATUS, AND CONTROL METHOD THEREFOR, AS WELL AS PROGRAM

BACKGROUND OF THE INVENTION

1. Field of the Invention

The present invention relates to an information processing apparatus and a control method therefor, as well as a program for implementing the control method, and more particularly to an information processing apparatus which is capable of displaying configuration items of functions of a plurality of image processing apparatuses, and a control method therefor, as well as a program for implementing the control method.

2. Description of the Related Art

Conventionally, in a case where a plurality of image processing apparatuses exist on a network in an office, a user who desires to use one of the image processing apparatuses via a PC is required, first, to designate the desired image processing apparatus by selecting the name thereof on a screen of the PC.

However, when there are a lot of image processing apparatuses on a network, it is difficult for the user to determine an image processing apparatus suitable for use only by the name thereof. To solve this problem, there is a demand for a purpose-oriented user interface via which the user can determine an image processing apparatus for use not by the name thereof, but by a function desired by the user.

To realize such a user interface, there has been proposed a technique in which the functions of a plurality of image processing apparatuses are collectively displayed so as to enable selection of an image processing apparatus that can satisfy functions selected by a user (see e.g. Japanese Patent Laid-Open Publication No. 2000-187573).

According to the technique proposed in Japanese Patent Laid-Open Publication No. 2000-187573, one of the image processing apparatuses displays thereon a screen for use in selecting functions that can be performed by other image processing apparatuses on the network. This enables a user to select one for use while feeling as if the functions were additionally provided in the image processing apparatus currently operated by the user. In this technique, however, the user cannot obtain information as to which of the image processing apparatuses on the network will perform the selected functions or information as to whether the functions can be performed by a single image processing apparatus, until the user actually completes selection of the function and gives an execution instruction.

For this reason, when no desired image processing apparatus is selected, the user has to carry out a selecting operation again after having completed the selection of functions and given the execution instruction.

SUMMARY OF THE INVENTION

The present invention makes it possible to improve user operability in selecting a desired one from a plurality of image processing apparatuses by selecting functions of the image processing apparatuses.

In a first aspect of the present invention, there is provided an information processing apparatus comprising an acquisition unit configured to acquire function information on each of a plurality of image processing apparatuses existing on a network, a selection unit configured to select an image processing apparatus from the plurality of image processing apparatuses, a display unit configured to display configuration items associated with functions provided in a image processing apparatus selected by the selection unit, and configuration items associated with functions provided in a image processing apparatus except the image processing apparatus selected by the selection unit, in a manner selectable by a user, a display control unit configured to cause the configuration items associated with the functions provided in the image processing apparatus except the image processing apparatus selected by the selection unit to be displayed such that an image processing apparatus equipped with a function associated with each of the configuration items can be identified by the user, and a transmission unit configured to transmit to one of the plurality of image processing apparatuses, data to be subjected to image processing based on configuration items selected by the user from the configuration items displayed by the display unit.

With the configuration of the first aspect of the present invention, it is possible to improve user operability in selecting a desired one from a plurality of image processing apparatuses by designating functions of the image processing apparatus.

The information processing apparatus further comprises a second selection unit configured to be operable when a configuration item associated with a function provided in the image processing apparatus except the selected image processing apparatus is selected by the user, to select the image processing apparatus equipped with the function associated with the configuration item, in place of the image processing apparatus selected by the selection unit, and the transmission unit can transmit the data to the image processing apparatus selected by the second selection unit.

The information processing apparatus comprises an identifying unit configured to identify from the plurality of image processing apparatuses, an image processing apparatus which is not provided with a function associated with a configuration item selected by the user from the configuration items displayed by the display unit, and a second identifying unit configured to identify a function which is provided in the image processing apparatus identified by the identifying unit, but not in the image processing apparatus equipped with the function associated with the configuration item selected by the user from the configuration items displayed by the display unit, and the display control unit can cause a configuration item associated with the function identified by the second identifying unit to be displayed such that the configuration item cannot be selected by the user.

The display control unit can cause, out of the configuration items displayed by the display unit, ones associated with functions provided in other image processing apparatuses than the image processing apparatus selected by the selection unit, to be displayed together with the names of the associated image processing apparatus.

The information processing apparatus is a personal computer, and the image processing apparatuses are printers.

In a second aspect of the present invention, there is provided an information processing apparatus comprising a search unit configured to search for image processing apparatuses on a network, a storage unit configured to store function information on a plurality of image processing apparatuses found by the search unit, a display unit configured to display configuration items associated with respective functions provided in each of the image processing apparatuses found by the search unit, in a manner selectable by a user, a selection unit configured to select a configuration item from the configuration items displayed by the display unit, according to a user instruction, an identifying unit configured to identify an image processing apparatus which is not provided with a function associated with the configuration item selected by the selection unit, and a second identifying unit configured to identify a function which is provided in the image processing apparatus identified by the identifying unit, but not in the image processing apparatus equipped with the function associated with the configuration item selected by the selection unit, wherein the display unit displays a configuration item associated with the function identified by the second identifying unit, such that the configuration item cannot be selected by the user.

The information processing apparatus is a personal computer, and the image processing apparatuses are printers.

In a third aspect of the present invention, there is provided a method of controlling an information processing apparatus, comprising an acquisition step of acquiring function information on each of a plurality of image processing apparatuses existing on a network, a selection step of selecting an image processing apparatus from the plurality of image processing apparatuses, a display step of displaying configuration items associated with functions provided in a image processing apparatus selected in the selection step, and configuration items associated with functions provided in a image processing apparatus except the image processing apparatus selected in the selection step, in a manner selectable by a user, a display control step of causing the configuration items associated with the functions provided in the image processing apparatuses except the image processing apparatus selected in the selection step to be displayed such that an image processing apparatus equipped with a function associated with each of the configuration items can be identified by the user, and a transmission step of transmitting to one of the plurality of image processing apparatuses, data to be subjected to image processing based on configuration items selected by the user from the configuration items displayed in the display step The method further comprises a second selection step of selecting, when a configuration item associated with a function provided in the image processing apparatus except the selected image processing apparatus is selected by the user, the image processing apparatus equipped with the function associated with the configuration item, in place of the image processing apparatus selected in the selection step, and the transmission step can include transmitting the data to the image processing apparatus selected in the second selection step.

The method comprises an identifying step of identifying from the plurality of image processing apparatuses, an image processing apparatus which is not provided with a function associated with a configuration item selected by the user from the configuration items displayed in the display step, and a second identifying step of identifying a function which is provided in the image processing apparatus identified in the identifying step, but not in the image processing apparatus equipped with the function associated with the configuration item selected by the user from the configuration items displayed in the display step, and the display control step can include causing a configuration item associated with the function identified in the second identifying step to be displayed such that the configuration item cannot be selected by the user.

The display control step can include causing, out of the configuration items displayed in the display step, ones associated with functions provided in other image processing apparatuses than the image processing apparatus selected in the selection step, to be displayed together with the names of the associated image processing apparatus.

The information processing apparatus can be a personal computer, and the image processing apparatuses can be printers.

In a fourth aspect of the present invention, there is provided a method of controlling an information processing apparatus, comprising a search step of searching for image processing apparatuses on a network, a storage step of storing function information on a plurality of image processing apparatuses found in the search step, a display step of displaying configuration items associated with respective functions provided in each of the image processing apparatuses found in the search step, in a manner selectable by a user, a selection step of selecting a configuration item from the configuration items displayed in the display step, according to a user instruction, an identifying step of identifying an image processing apparatus which is not provided with a function associated with the configuration item selected in the selection step, and a second identifying step of identifying a function which is provided in the image processing apparatus identified in the identifying step, but not in the image processing apparatus equipped with the function associated with the configuration item selected in the selection step, wherein the display step includes displaying a configuration item associated with the function identified in the second identifying step, such that the configuration item cannot be selected by the user.

The information processing apparatus can be a personal computer, and the image processing apparatuses can be printers.

In a fifth aspect of the present invention, there is provided a program for causing a computer to execute a method of controlling an information processing apparatus, comprising an acquisition module for acquiring function information on each of a plurality of image processing apparatuses existing on a network, a selection module for selecting an image processing apparatus from the plurality of image processing apparatuses, a display module for displaying configuration items associated with functions provided in a image processing apparatus selected by the selection module, and configuration items associated with functions provided in a image processing apparatus except the image processing apparatus selected by the selection module, in a manner selectable by a user, a display control module for causing the configuration items associated with the functions provided in the image processing apparatuses except the image processing apparatus selected by the selection module to be displayed such that an image processing apparatus equipped with a function associated with each of the configuration items can be identified by the user, and a transmission module for transmitting to one of the plurality of image processing apparatuses, data to be subjected to image processing based on configuration items selected by the user from the configuration items displayed by the display module.

The features and advantages of the invention will become more apparent from the following detailed description taken in conjunction with the accompanying drawings.

BRIEF DESCRIPTION OF THE DRAWINGS

FIG. 5 is a diagram showing an example of printer information on each registered printer held by the virtual printer driver shown in FIG. 4.

FIG. 6 is a diagram showing an example of a printer function table generated by a printer function table generator appearing in FIG. 4.

FIG. 14 is a diagram showing an example of a printer function table used in a second embodiment of the present invention.

DETAILED DESCRIPTION OF THE PREFERRED EMBODIMENTS

The present invention will now be described in detail with reference to the drawings showing preferred embodiments thereof.

Figure 1:
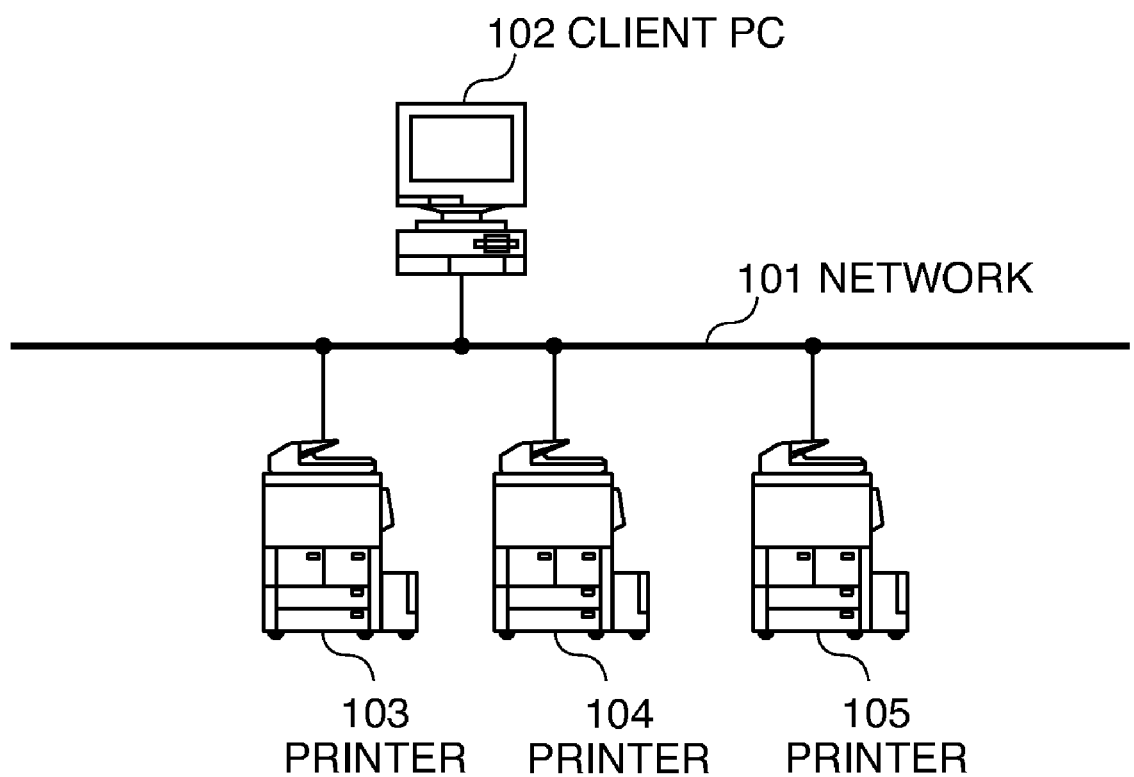
FIG. 1 is a diagram of the configuration of a network system in which a client PC and printers are interconnected via a network.

FIG. 1 is a diagram of the configuration of a network system in which a client PC implementing an information processing apparatus according to a first embodiment of the present embodiment and printers are interconnected via a network. Although in the present embodiment, the network system includes the printers as image processing apparatuses, it may also include facsimile machines, and multifunction peripherals each equipped with the functions of a printer, a copying machine, a scanner, and a facsimile machine.

As shown in FIG. 1, the network system in the present embodiment is constructed by connecting the client PC (Personal Computer) 102 and the printers 103 to 105 to the network 101.

The network 101 is implemented e.g. by an Ethernet (registered trademark) using the TCP/IP protocol or the like. The client PC 102 issues a print request to selected ones of the printers, described hereinafter, in response to user operation. The printers 103 to 104 connected to the network 101 are the monochrome laser beam printer 103, the color laser beam printer 104, and the color digital multifunction peripheral 105.

Figure 2:
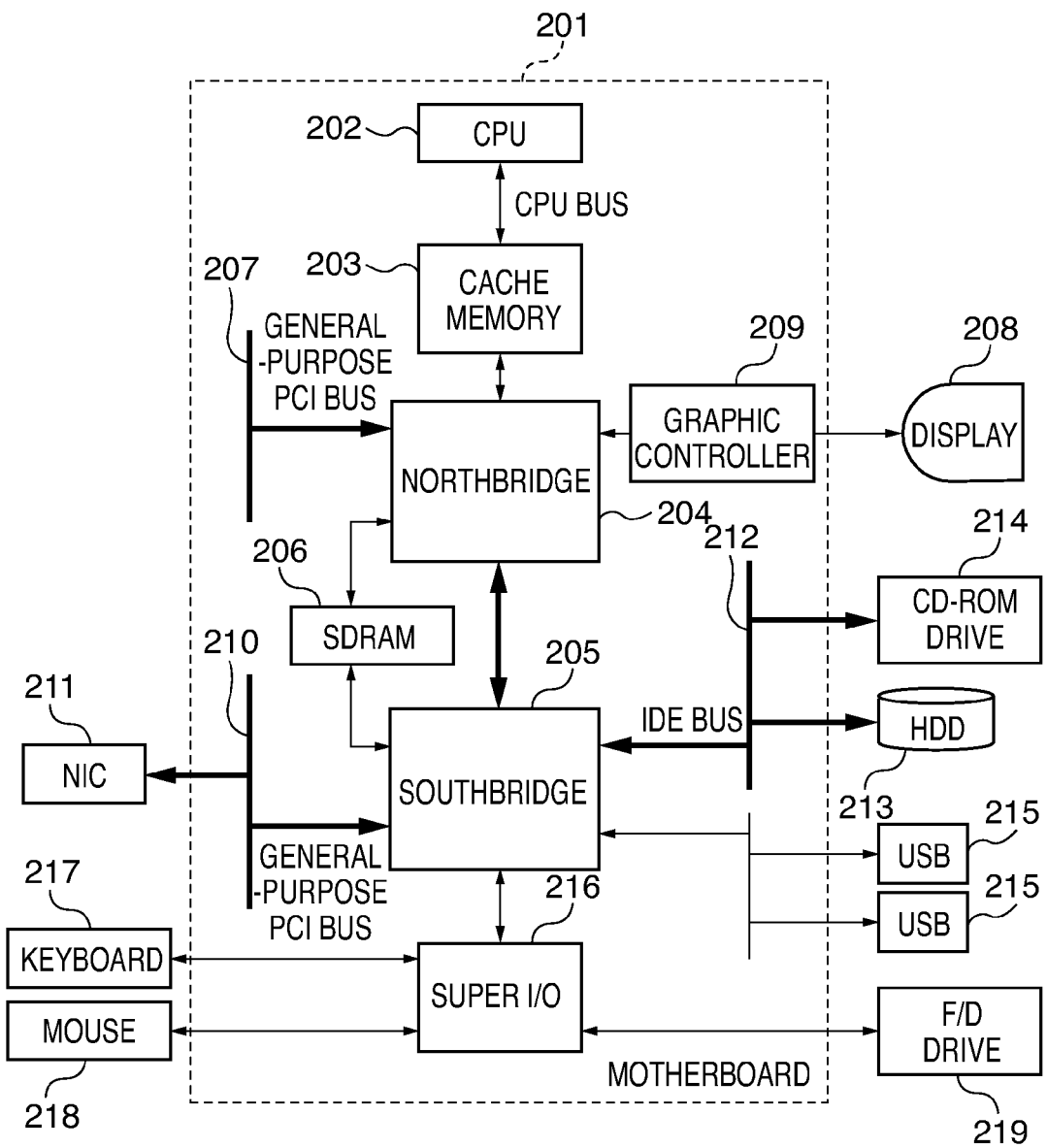
FIG. 2 is a diagram of the configuration of the client PC appearing in FIG. 1.

FIG. 2 is a diagram of the configuration of the client PC appearing in FIG. 1.

The hardware configuration of the client PC 102 described below is only an example of a generally known hardware configuration including various connecting methods and various buses and interfaces. In the following, the configuration will be described together with the operation of the client PC 102.

Referring to FIG. 2, a portion enclosed by dotted lines is a motherboard 201, in which a CPU 202 controls the overall operation of the software of the client PC 102 while communicating with a North bridge 204 and a Southbridge 205 via a cache memory 203.

On the motherboard 201, a memory (SDRAM 206) is used for data exchange between the North bridge 204 and the Southbridge 205 and temporary storage of data in the client PC 102.

The North bridge 204 has a general-purpose PCI (32 bits/33 MHz) bus 207 to which a SCSI external device or the like can be optionally (additionally) connected. The North bridge 204 is also connected to a graphic controller 209 for controlling the display operation of a display 208.

The Southbridge 205 has a general-purpose PCI bus 210 different from the PCI bus 207, which enables network connection via a NIC 211. Further, the Southbridge 205 has an IDE bus 212 to which is connected a hard disk drive (HDD) 213 for storing various kinds of data including control software of the client PC 102.

Furthermore, a CD-ROM drive 214 useful in data reading e.g. when the client PC 102 is installed or in data storage (archiving) of a large amount of data is connected to the Southbridge 205 via the IDE bus 212. A CD-R drive or a CD-R/W drive may be connected to the Southbridge 205 in place of the CD-ROM drive 214.

A USB port 215 enables access to an external USB device represented by a USB memory. Further, the Southbridge 205 can be connected via a super I/O section 216 to a keyboard 217 and a mouse 218, and a floppy (registered trademark) disk drive (F/D drive) 219, for data input/output.

Figure 3:
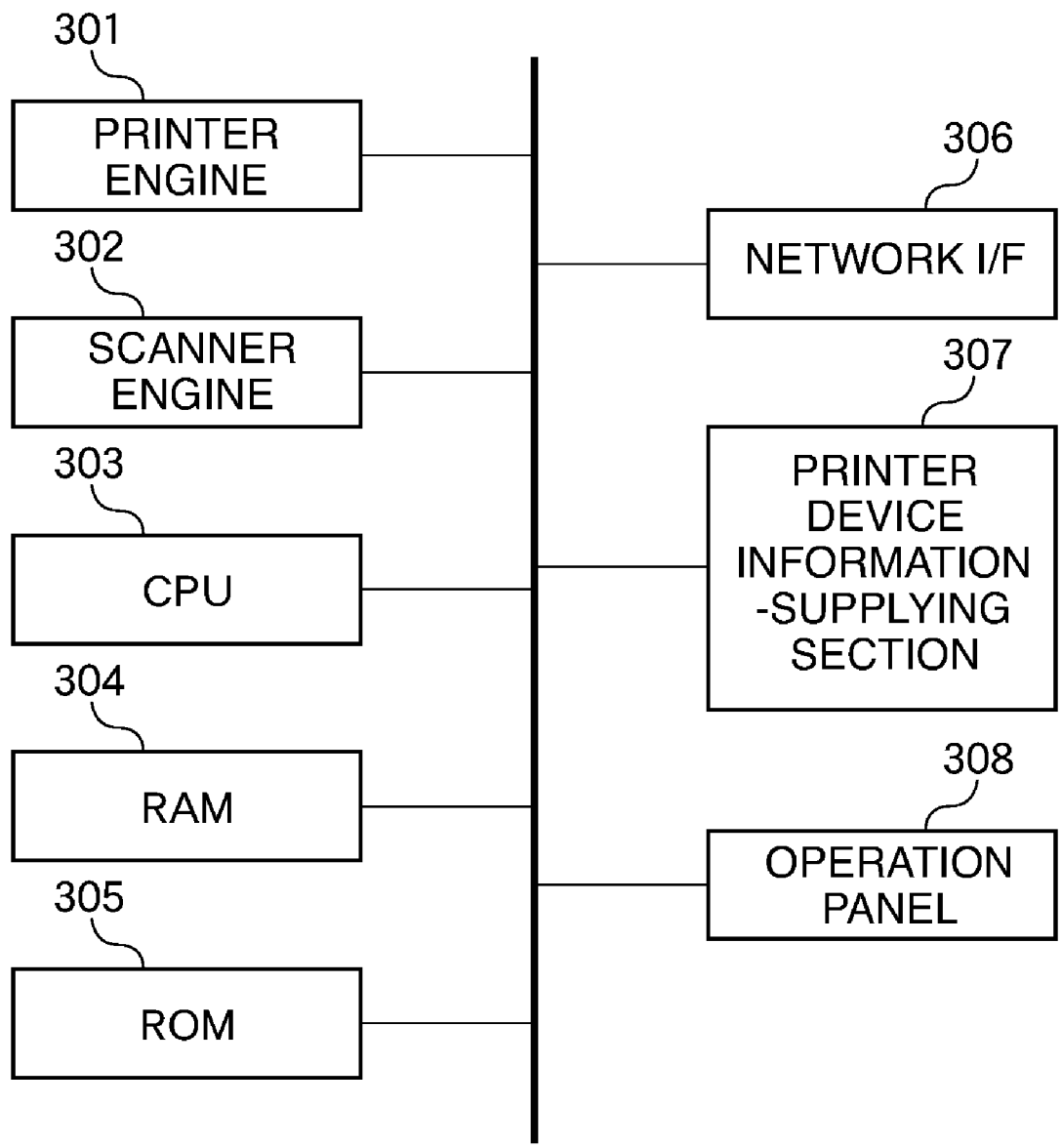
FIG. 3 is a schematic diagram of the configuration of a printer appearing in FIG. 1.

FIG. 3 is a schematic diagram of the configuration of a printer appearing in FIG. 1.

Referring to FIG. 3, a printer engine 301 utilizes a known printing technique, such as the electrophotographic printing method or the inkjet printing method. When the printer is implemented by a multifunction peripheral, it is also provided with a scanner engine 302 utilizing a known optical reading technique.

A central processing unit (hereinafter referred to as "the CPU") 303 controls the overall operation of the printer 103 (104 or 105). A RAM 304 temporarily stores image data to be printed by the printer engine 301 and printer information generated by a printer device information-supplying section 307. A ROM 305 stores operation control programs to be executed by the CPU 303.

A network interface (I/F) 306 provides an interface for connection to the network 101. The printer device information-supplying section 307 supplies information including the name, location, status, functions, and so forth of the printer 103 (104 or 105) to the client PC 102 on the network 101. An operation panel 308 provides user interface. For example, the operation panel 308 is comprised of a display device, such as a liquid crystal display or an LED, and a plurality of operation buttons.

Now, a description will be given of a virtual printer driver. In a case where the user uses the printers 103 to 105 via the client PC 102 on the network 101 shown in FIG. 1, it is required to install the printer drivers of the respective printers 103 to 105 in advance in the HDD 213.

In the conventional printer driver, a user is required to perform a selecting operation on the client PC 102 to select a printer to be used, and then set print settings, as described hereinbefore.

On the other hand, the virtual printer driver based on which the present invention is realized is capable of comprehensively displaying configuration items of each of the printer drivers installed in advance in the client PC 102. The virtual printer driver is configured to determine a printer most suitable for print settings set via a configuration screen by the user and give a print instruction to the most suitable printer.

Figure 4:
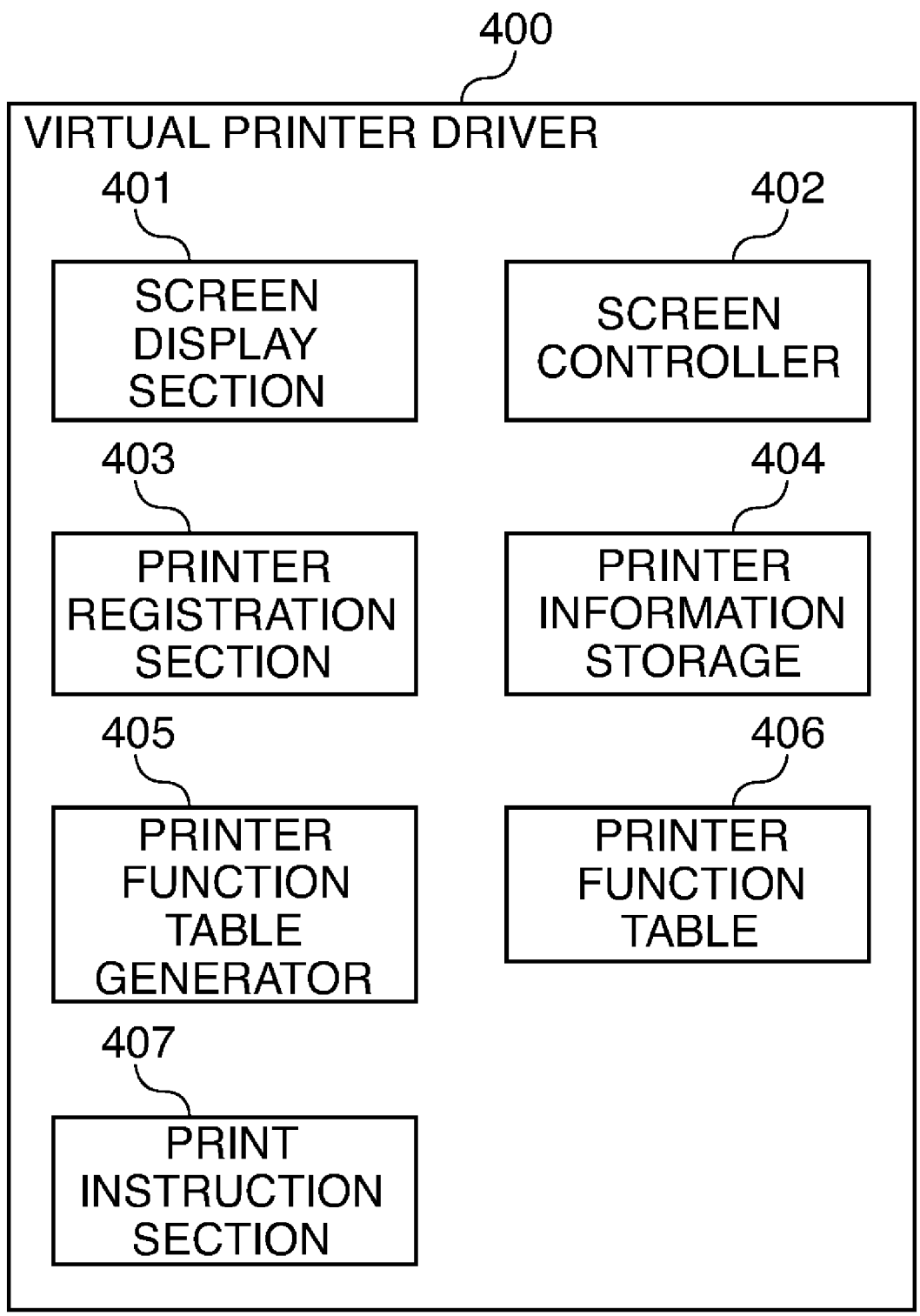
FIG. 4 is a schematic diagram of a virtual printer driver installed in the client PC appearing in FIG. 1.

FIG. 4 is a schematic diagram of the virtual printer driver installed in the client PC appearing in FIG. 1.

The virtual printer driver 400 will be described in detail with reference to FIG. 4. The virtual printer driver 400 is installed in the HDD 213 of the client PC 102.

A screen display section (display unit) 401 causes a configuration screen for printer drivers to be displayed on the display 208. A screen controller (display control unit) 402 controls/generates a screen based on configuration information set by the user via the configuration screen, and information, described hereinafter, held within the virtual printer driver 400.

A printer registration section (selection unit) 403 is capable of registering a plurality of printers to each of which a print instruction can actually be given through the virtual printer driver 400. The printer registration section 403 can select one printer for use by default from the registered printers.

A printer information storage 404 stores printer information items referred to hereinafter. A printer function table generator 405 generates a printer function table 406 required for screen control, based on the printer information items stored in the printer information storage 404. A print instruction section 407 generates print data based on settings configured by the user, and sends the print data to a selected printer to thereby give a print instruction.

The printers or the associated printer drivers are registered in advance in the printer registration section 403. The following are two examples of the method of setting printer information on each of the printers is set in the virtual printer driver 400 e.g. by the following two methods:

(1) When a printer or a printer driver is registered, the printer information on each printer is set in the printer information storage 404 at the same time.

(2) When the virtual printer driver 400 is started up, printer information is collected from the printers registered in the printer registration section 403 via the network 101.

Although in the present invention, it does not matter whichever method is employed, it is assumed in the following description that information on each registered printer is acquired via the network 101 as mentioned in (2).

FIG. 5 is a diagram showing an example of printer information on a registered printer held by the virtual printer driver shown in FIG. 4.

Printer information is comprised of identification information for identifying an associated printer, location information indicative of a physical location at which the printer is installed, status information indicative of the status of the printer, and function information indicative of functions provided in the printer.

The identification information may be a printer name or a network address, such as an IP address. Alternatively, it may be any information, such as an identification ID, by which an associated printer can be identified.

FIG. 6 is a diagram showing an example of a printer function table generated by a printer function table generator appearing in FIG. 4.

The printer function table 406 is formed by extracting function information required for controlling screen display from the printer information stored in the printer information storage 404 in association with each of the printers. Further, the printer function table 406 contains an information item indicative of whether each printer is registered as a default one in the printer registration section 403.

The configuration screen for the virtual printer driver 400 is displayed by the following display methods so as to enable the user to smoothly configure print settings:

(1) At the Start-Up of the Virtual Printer Driver

A default printer has already been determined, and the functions of the other printers than the default printer are also displayed in a selectable manner. In this case, the configuration screen is displayed such that differences in function between the default printer and the other printers can be visually recognized by the user.

(2) After the Start of Configuration of Print Settings

Candidate printers which are capable of printing are narrowed down according to print settings selected by the user. Configuration items of print settings which cannot be set to the candidate printer group are made unselectable (grayed out) on the configuration screen. In this case, the configuration screen is displayed such that differences in function between the printers of the candidate printer group can be visually recognized by the user.

Figure 7:
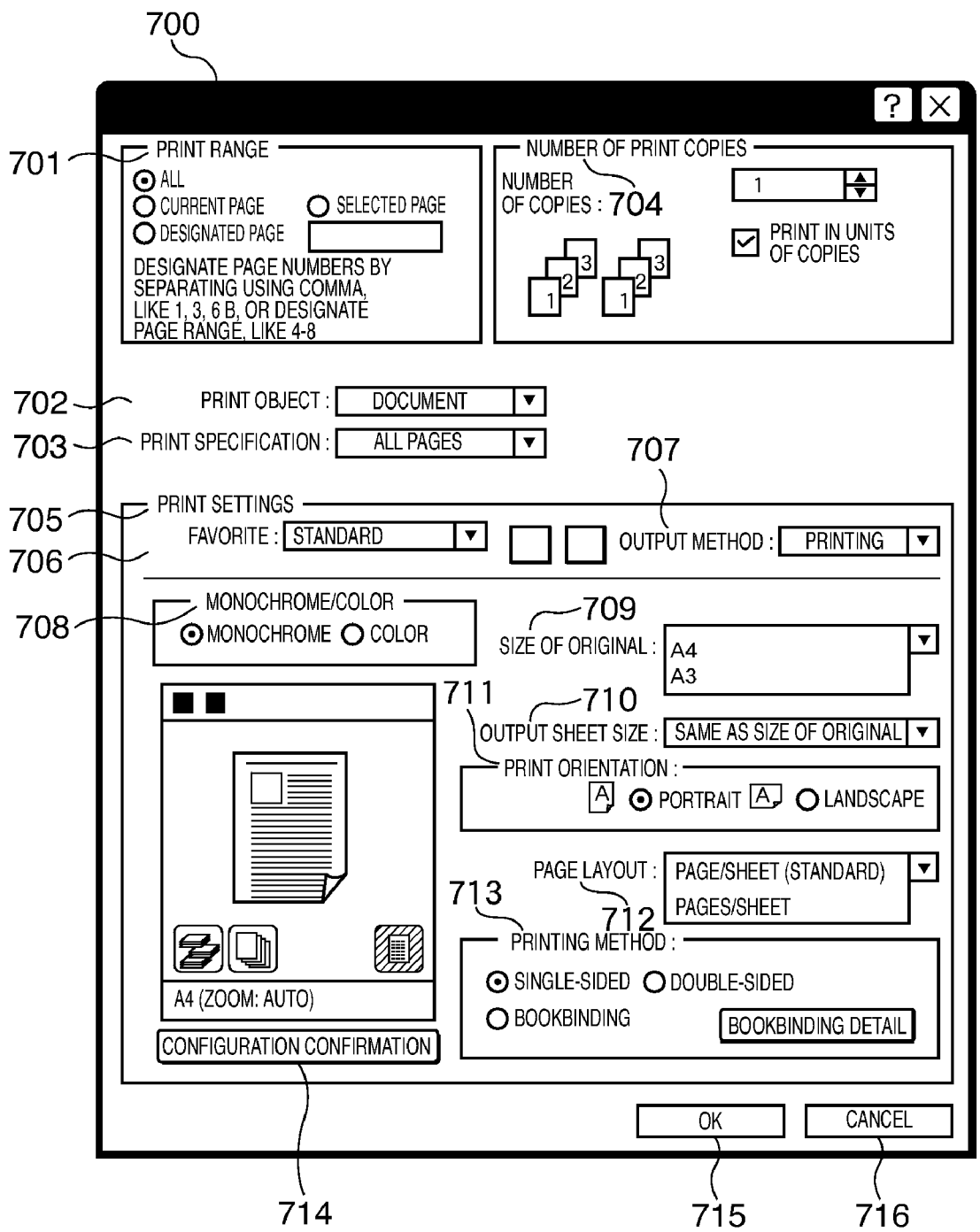
FIG. 7 is a view showing an example of a basic configuration screen for the virtual printer driver.

FIG. 7 is a view showing an example of a basic configuration screen for the virtual printer driver shown in FIG. 4.

Referring to FIG. 7, a configuration screen 700 for the virtual printer driver 400 is displayed when the user selects the virtual printer driver 400 from a general print menu of a print application so as to cause a printer to print out print data.

By selecting one of "all", "current page", "selected portion", and "designated page(s)" radio buttons in a "print range" section 701, the user designates a page or pages to be printed. When the "designated page(s)" radio button is selected, the user enters the page numbers of pages to be printed, in an edit box.

Further, the user selects an attribute of a document for printing by a "print target" pull-down list box 702 and then specifies by a "print specification" pull-down list box 703 whether all pages are to be printed or only odd pages or even pages are to be printed.

In a "number of print copies" section 704, the user enters the number of copies for printing in a "number of copies" spin box. In the case of printing a plurality of sheets not in units of pages, but in units of copies, a "print in units of copies" checkbox is checked.

Configuration items in a "print settings" section 705 are an example of components of a part of the configuration screen, which are associated with page setting processing and finish processing. In a "favorite" pull-down list box 706, the user selects an optimal configuration of print settings from predetermined configurations of print settings. Two buttons arranged leftward of the "favorite" pull-down list box 706 are used to add a configuration of print settings as an favorite item for selection, or to edit the configuration of print settings selected as the favorite item.

In an "output method" pull-down list box 707, the user designates an output method, i.e. whether to cause a printer to perform normal printing or secure printing, whether to store print data in a hard disk of the printer, and whether to execute editing and previewing by the printer.

In a "monochrome/color" section 708, the user selects one of "monochrome" and "color" radio buttons to thereby designate monochrome printing or color printing. In an "size of an original" pull-down list box 709 and an "output sheet size" pull-down list box 710, the user selects the size of an original to be printed and the size of a sheet to be output from the printer.

By selecting one of radio buttons in a "print orientation" section 711, the user sets an orientation of a sheet to be output from the printer from options "vertical (portrait)" and "horizontal (landscape)". In a "page layout" pull-down list box 712, N-up printing (printing in which a plurality of pages are laid out within a single print page) is designated. By selecting one of radio buttons in a "printing method" section 713, the user sets one of "single-sided printing", "double-sided printing", and "bookbinding printing".

By pressing a "configuration confirmation" button 714, it is possible to display a list of print settings configured on the configuration screen 700. The print settings configured on the configuration screen 700 are reflected in a page image displayed on the configuration screen 700.

After completing the configuration of the print settings on the configuration screen 700 for the virtual printer driver 400, the user presses an "OK" button 715, whereby the printing attributes (print settings) thus set can be reflected on actual printing. The print settings configured on the configuration screen 700 can be canceled by pressing a "cancel" button 716.

Figure 13:
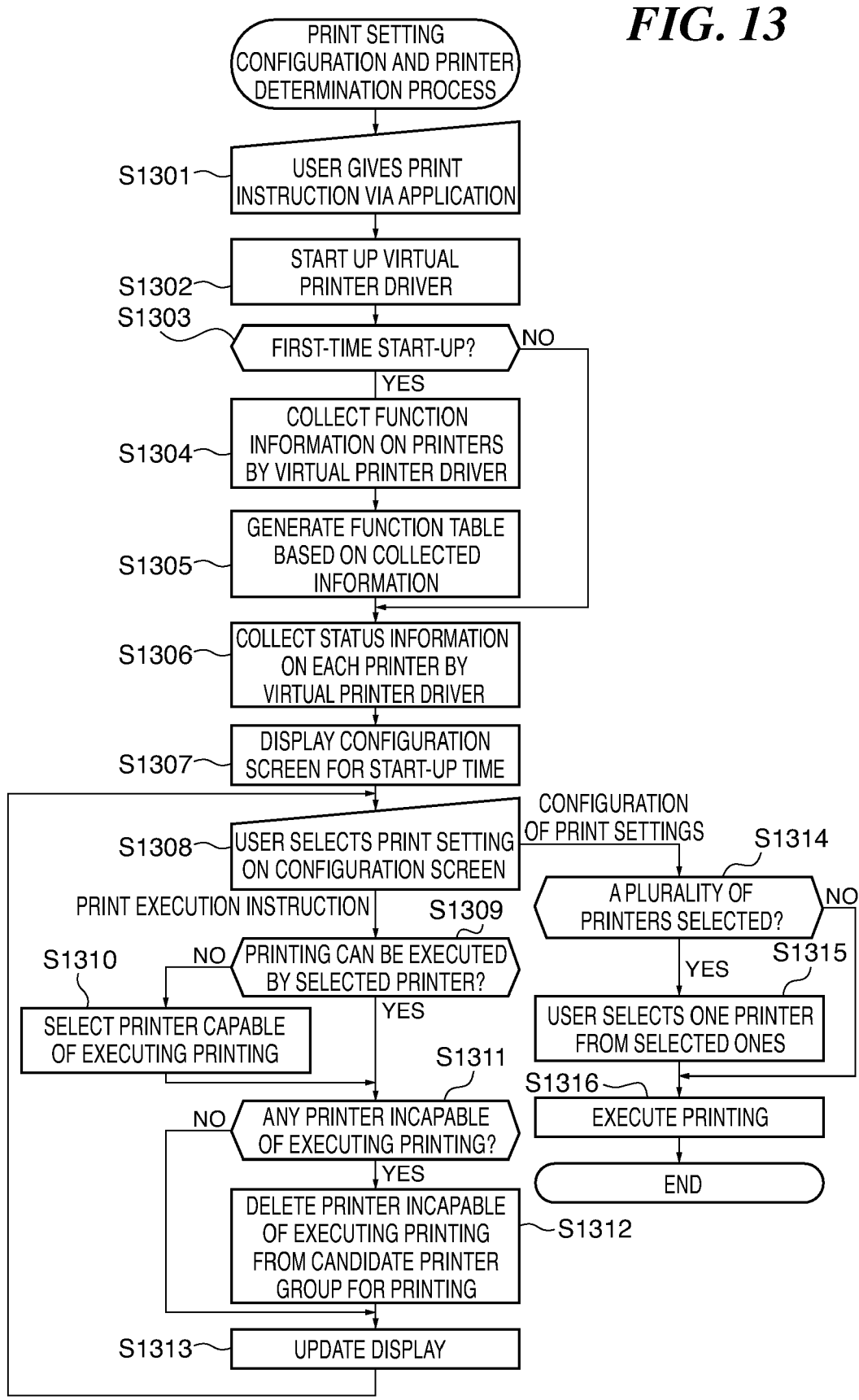
FIG. 13 is a flowchart of a print setting configuration and printer determination process which is executed by the virtual printer driver.

Changes in the configuration screen for the virtual printer driver 400 and a flow of processing by the virtual printer driver 400 will be described with reference to FIGS. 8 to 12 showing configuration screens for the virtual printer driver and FIG. 13 showing the flowchart of a print setting configuration and printer determination process by the virtual printer driver 400. All steps in FIG. 13 are executed by the virtual printer driver 400, except steps S1301 and S1308 executed by the user.

Referring to FIG. 13, first, when the user gives a print instruction by application software on the client PC 102 (step S1301), the virtual printer driver 400 is started up in response thereto in a step S1302.

During the start-up processing, it is determined in a step S1303 whether or not this is the first time to start up the virtual printer driver 400 after registration of the printer drivers of the respective printers 103 to 105. If this is the first-time start-up, the virtual printer driver 400 collects location information and function information on the registered printers (printers 103 to 105) in a step S1304.

Then, in a step S1305, the printer function table 406 is generated based on the function information collected in the step S1304, and the process proceeds to a step S1306. If it is determined in the step S1303 that this is not the first-time start-up, the process directly proceeds to the step S1306, wherein only status information on the printers is collected. As for the location information and the function information, only when a new printer driver is additionally registered, it is required to acquire the location information and function information on a printer associated with the additionally registered printer driver.

Then, in a step S1307, the screen controller 402 forms a screen based on the configuration of print settings for the default printer set in the printer function table 406, by the aforementioned display method to be executed at the start-up of the virtual printer driver. Based on the result of formation of the screen, the screen display section 401 displays a virtual printer driver configuration screen 800, shown in FIG. 8, on the display 208 of the client PC 102.

Figure 8:
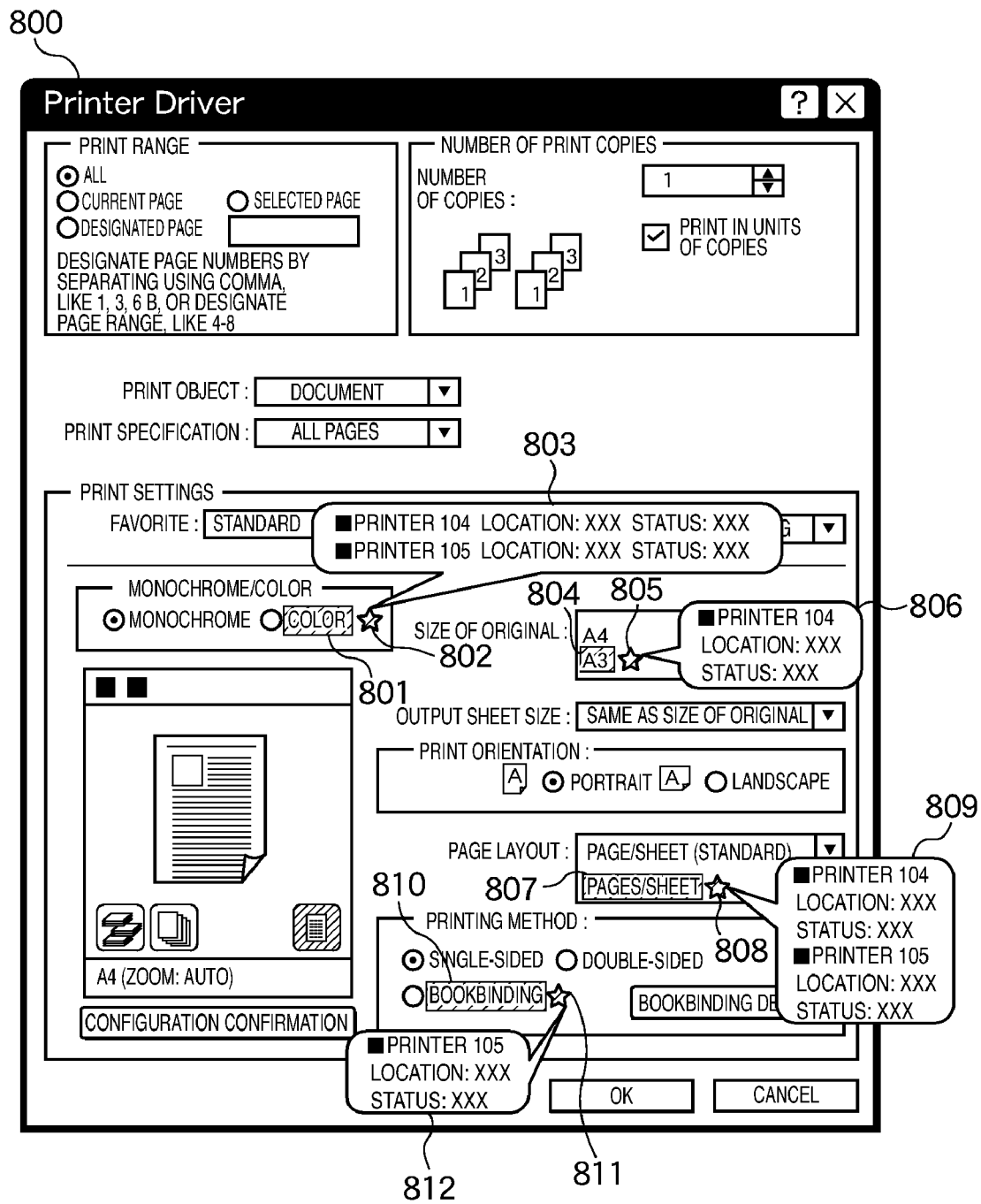
FIG. 8 is a view showing a first example of the configuration screen for the virtual printer driver in a default display mode.
Figure 9:
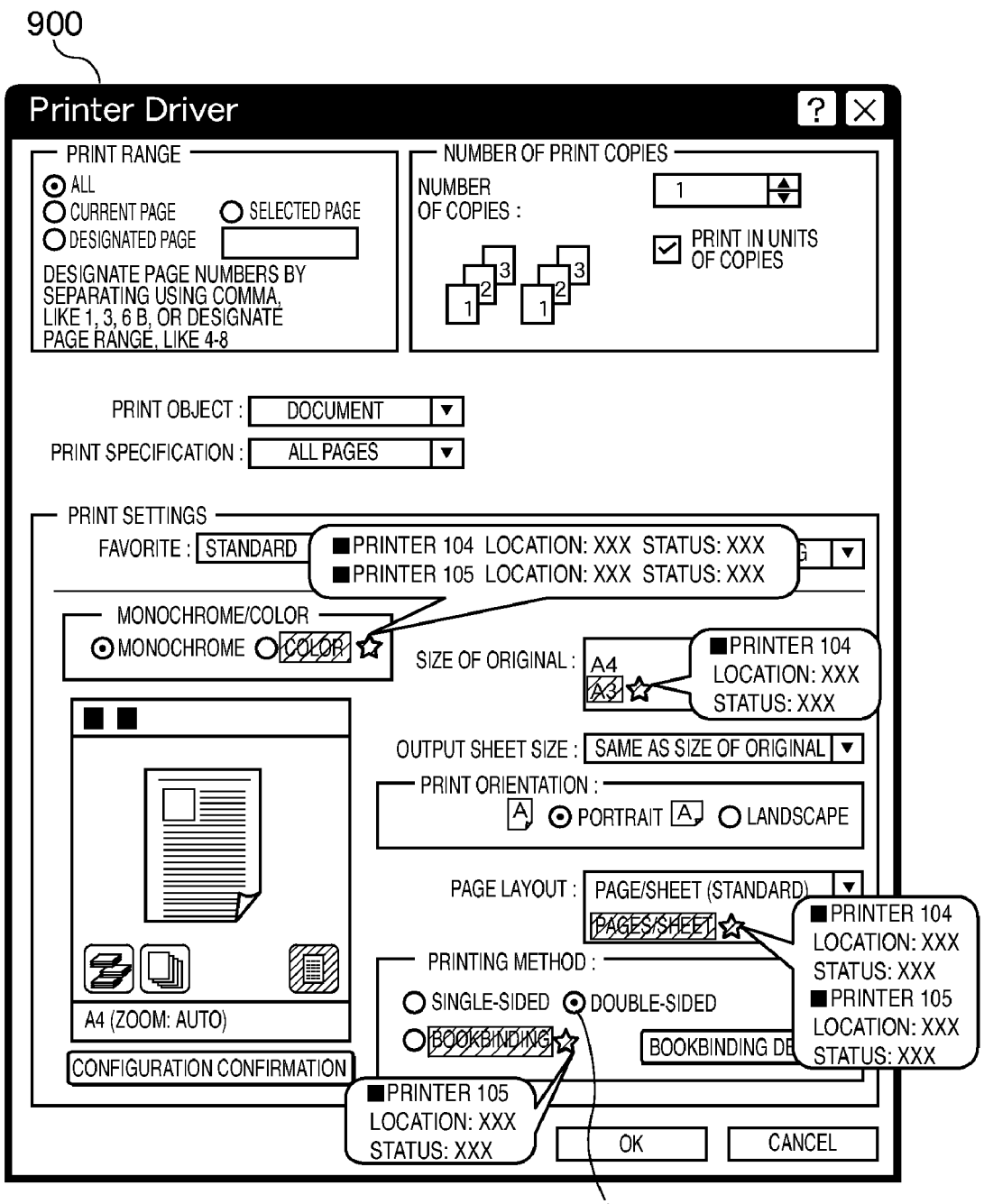
FIG. 9 is a view showing a second example of the configuration screen for the virtual printer driver in the default display mode.

The configuration screen 800 shown in FIG. 8 is a first example of the configuration screen displayed at the start-up of the virtual printer driver in a case where the printer 103 of the registered printers 103 to 105 is registered as the default printer.

In the present embodiment, since the printer 103 is designated as the default printer in the printer function table in FIG. 6, configuration items associated with respective functions of the printers 104 and 105 which are not provided in the printer 103 are displayed on the configuration screen 800 such that the user can visually recognize them as such.

For example, the default printer 103 is a monochrome machine, and hence a configuration item of "color" 801 associated with the color printing function which the printers 104 and 105 have but not the printer 103 is displayed such that the user can visually recognize the configuration item as such.

Further, when a link 802 is referred to, the location information and status information on the other printers than the default printer 103 are displayed as hint information 803. The display of the configuration item of the print setting in the visually recognizable manner and the hint information 803 on the printers 104 and 105 to which the print setting can be set assist the user in determining whether or not the print setting "color" can be selected.

For example, in a case where the user is thinking of color printing, the user can grasp, in advance, from the hint information 803, the location of a printer which is capable of color printing and the status information thereon including information as to toner exhaustion, sheet exhaustion, or current execution of large-volume printing, for example.

By obtaining the above-mentioned information in advance, the user can select monochrome printing in place of color printing, depending on the current conditions. Even in the case of performing color printing, the user can grasp the location and status of a printer in advance to thereby predict a trouble that may occur during a printing operation if the printer is selected, so that user-friendliness can be improved.

On the configuration screen 800, respective displays 804 to 812 concerning "size of an original", "page layout", and "printing method", are displayed, similarly to the displays 801 to 803, such that differences in function between the printers 104 and 105 and the default printer 103 can be visually recognized by the user.

If the user selects a configuration item of a print setting on the configuration screen 800 in the step S1308 of the flowchart in FIG. 13, the process proceeds to a step S1309, whereas if the user gives a print execution instruction, the process proceeds to a step S1314. After the configuration of print settings is started by the user, display is performed such that candidate printers available for printing can be narrowed down according to the print settings selected by the user. More specifically, in the step S1309, the screen controller 402 of the virtual printer driver 400 determines, based on the printer function table 406, whether or not printing according to the print settings including the print setting selected by the user this time can be executed by the currently selected printer (default printer 103 in the case of the start-up time).

If the printer is capable of executing printing according to the print settings, the process proceeds to a step S1311, wherein it is determined by referring to the printer function table 406 whether or not there is any printer that is incapable of executing printing according to the currently designated print settings including the print setting selected this time. If there is no printer that is incapable of executing printing according to the currently designated print settings, the process proceeds to a step S1313. In the step S1313, display is updated following the display method to be executed after the start of configuration of print settings, and then the process returns to the step S1308, wherein a user input is awaited. For example, when a configuration item "double-sided printing" 901 is selected on a configuration screen 900 in FIG. 9 for the virtual printer driver 400, since the default printer 103 is provided with the double-sided printing function, the process proceeds from the step S1309 to the step S1311, wherein it is determined whether or not there is any printer that is incapable of executing printing according to the print settings including the print setting selected this time. It can be determined based on the printer function table 406 that all the printers are capable of "double-sided printing", and hence the process proceeds through the step S1313 (in the present example, since all the functions of the default printer 103 can be performed by the other printers 104 and 105, display is not updated) to the step S1308, wherein a user input for configuration of print settings is awaited.

If it is determined in the step S1309 that printing according to the print setting selected this time by the user cannot be executed by the default printer 103, the process proceeds to a step S1310. In the step S1310, a printer which is capable of executing printing according to the print setting selected by the user is selected based on information on the other printers 104 and 105 than the default printer 103 in the printer function table 406.

Figure 10:
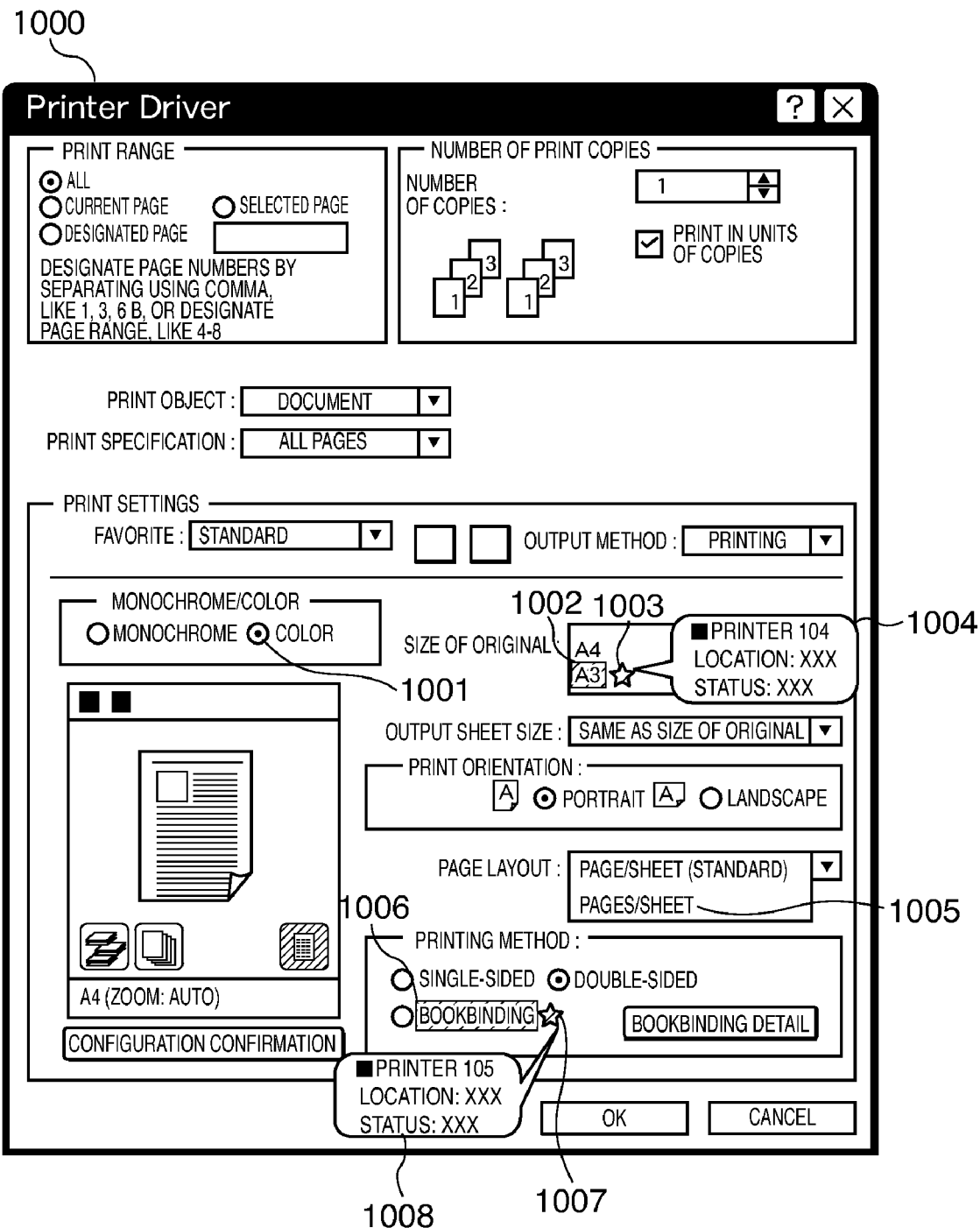
FIG. 10 is a view showing a first example of the configuration screen for the virtual printer driver in a default undetermined display mode.

For example, when the "color" radio button 801 is selected on the configuration screen 800 in FIG. 8, the screen is switched to a configuration screen 1000 in FIG. 10. At the start-up time, a highlighted display of a difference in function from the default printer 103 and links as hint information on the printers were provided e.g. as shown by the displays 801 and 802 in FIG. 8.

On the configuration screen 1000, however, the "color" radio button 1001 is normally displayed as the configuration item of a print setting common to the printers 104 and 105 selected anew in the step S1310 as printers which are capable of color printing.

Further, a display 1005 of "2 page/sheet" in the "page layout" box is also a configuration item of a print setting common to the printers 104 and 105, and hence it is normally displayed since the printers 104 and 105 are selected as the printers which are capable of printing according to the selection of the "color" radio button 1001. On the other hand, displays 1002 to 1004 in the "size of an original" section and respective displays 1006 to 1007 of the "bookbinding printing" radio button and a link and hint information are highlighted, since they are associated with functions different between the printers 104 and 105. On the configuration screen 1000, similarly to the configuration screen 800 at the start-up time, the user can confirm the location and status of a printer to which print settings can be set, by referring to respective displays 1004 and 1008 of the hint information.

Figure 11:
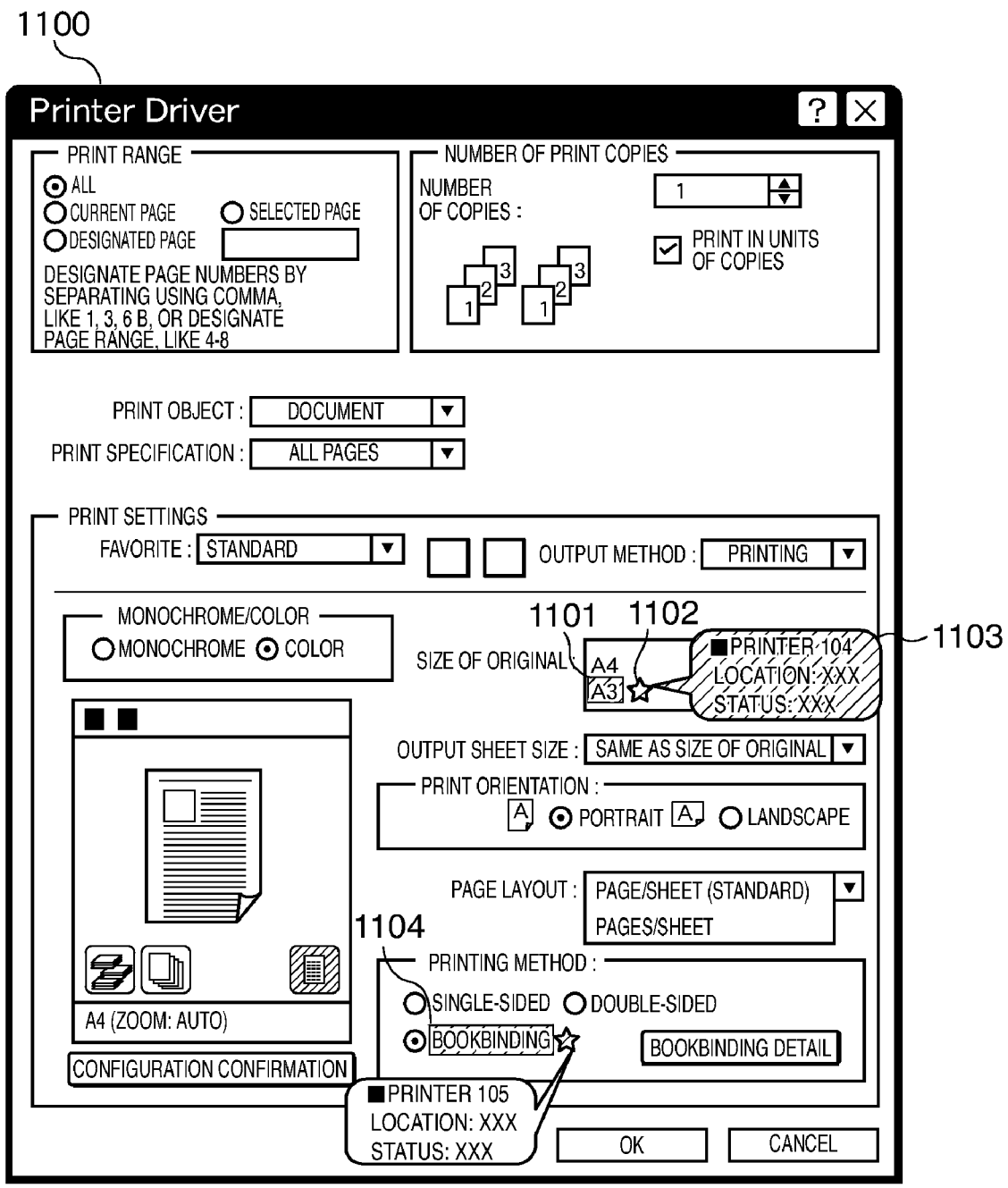
FIG. 11 is a view showing a second example of the configuration screen for the virtual printer driver in the default undetermined display mode.
Figure 12:
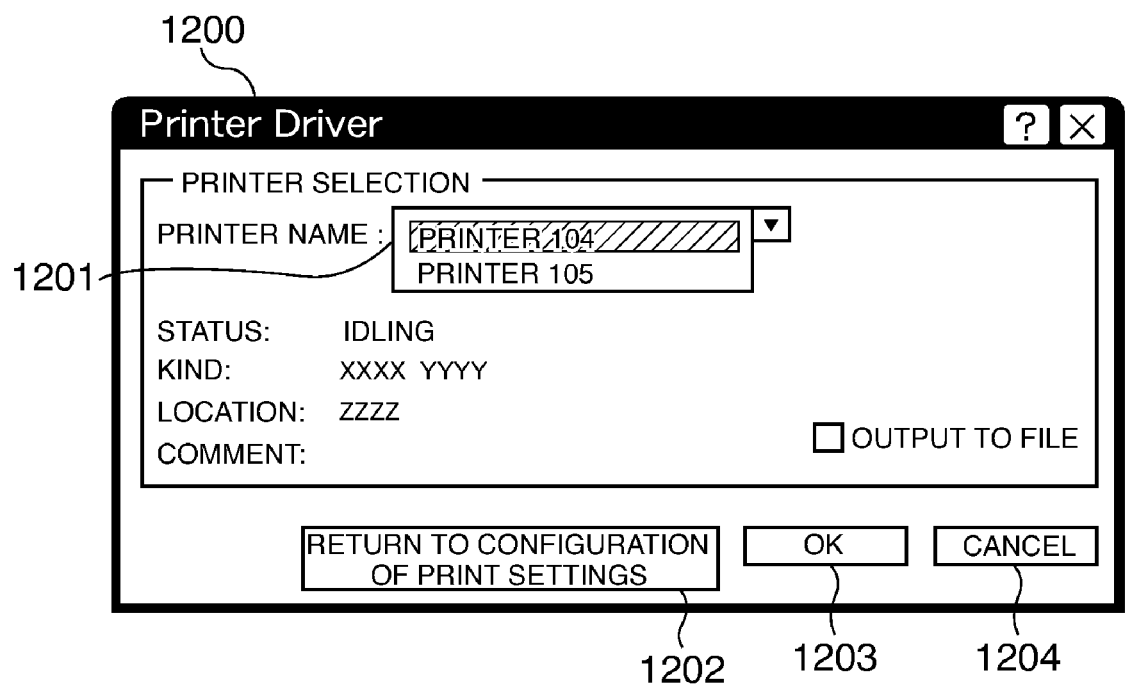
FIG. 12 is a view of a printer selection screen of the virtual printer driver.

The process returns to the step S1308, wherein the user performs configuration of print settings again on the configuration screen 1000. A displayed screen 1100 in FIG. 11 is a configuration screen displayed when the user sets print settings associated with functions different between the printers 104 and 105, such as "size of an original" for which the displays 1002 to 1004 are displayed and the "bookbinding printing" for which the displays 1006 to 1008 are displayed, on the configuration screen 1000.

When the user sets the print setting of the "bookbinding printing" 1104, which is associated with a function provided in the printer 105, it is determined in the step S1309 whether or not the selected printer is capable of bookbinding printing. The configuration screen 1000 is displayed in a manner permitting selection of only configuration items of print settings which can be set, and hence the process proceeds to the step S1311 without requiring any further configuration. In the step S1311, it is determined, based on the printer function table 406, whether or not there is any printer that is incapable of executing printing according to the currently designated print settings. At a time point when the bookbinding printing function of the printer 105 is set, it is determined that it is impossible to perform printing according to a print setting of "sheet size A3", which is a function provided in the printer 104 alone, by the present print settings, and hence the process proceeds to a step S1312. In the step S1312, the printer 104 is deleted from the candidate printer group for printing, and then in the step S1313, the display is updated. As a consequence, displays 1101 to 1103 of "size of an original" associated with functions which only the printer 104 has are grayed out to be unselectable on the screen.

Thus, configuration items of print settings which cannot be set simultaneously to each printer are grayed out to be unselectable, according to the configuration item of a print setting set by the user, so that the user can achieve consistent configuration of print settings for a printing operation which can be realized by each single printer.

Further, for example, when the user cancels selection of the "color" radio button 1001 and switches the configuration back to the print setting of "monochrome", it is determined in the step S1309 that the function is executable even by other printers than the selected printer, and the process proceeds to the step S1310. Therefore, it is possible to add the printer 103 once deleted from the candidate printer group for printing as a candidate again to the candidate printer group and update the display.

When the user presses the "OK" button (denoted by 715 in FIG. 7) on the configuration screen in the step S1308 and gives a print execution instruction, the process proceeds to the step S1314. In the step S1314, it is determined whether or not a plurality of printers available for printing have been selected by the screen controller 402 of the virtual printer driver 400 according to the configuration of print settings set by the user.

If a single printer has been selected, the process proceeds to a step S1316, wherein the print instruction section 407 transmits print data to the selected printer and gives a print instruction. On the other hand, if a plurality of printers have been selected, the process proceeds to a step S1315, wherein the screen display section 401 displays a printer selection screen 1200 shown in FIG. 12.

The user selects a printer to be used for printing from the printers shown in a pull-down list box 1201, and presses an "OK" button 1203, whereby the print instruction section 407 gives a print instruction to the printer selected in the step S1316.

It is also possible to return to the configuration screen by pressing a "return to configuration of print settings" button 1202. When the user desires to cancel the configuration of print settings, the user can cancel configuration of print settings by pressing a "cancel" button 1204.

As described above, according to the present embodiment, when a virtual printer driver is started up, functions which a printer designated as a default printer is not provided with are displayed on a configuration of print settings screen so that the user can designate the functions as print settings. At this time, print settings according to which printing can be executed by other printers than the currently selected printer are displayed such that a printer which is capable of performing each function can be recognized, which improves user operability. Further, when a print setting is input, functions which cannot be executed by a single printer are grayed out to be unselectable on the configuration screen for print settings, and therefore it is possible to prevent the user from erroneously designating a print setting which makes printing unexecutable.

In the client PC as the information processing apparatus according to the first embodiment, a plurality of printers are registered in advance in the virtual printer driver, and further the default printer is designated. In a client PC as an information processing apparatus according to a second embodiment of the present invention, whenever the virtual printer driver is started up, a printer compatible with the virtual printer driver is found on the network and registered as a candidate printer.

In the following, the client PC as the information processing apparatus according to the second embodiment will be described in detail mainly as to different points from the first embodiment.

A network system including the client PC as the information processing apparatus according to the second embodiment is the same as the network system shown in FIG. 1. However, the functions of each of the printers 103 to 105 are different from corresponding ones shown in FIG. 6, and they are configured as shown in FIG. 14. More specifically, the printer 103 is provided with the color printing function, but not with the double-sided printing function or the stapling function. The printer 104 is provided with the double-sided printing function and the stapling function, but not with the color printing function. The printer 105 is provided with the color printing function and the double-sided printing function, but not with the stapling function.

It is assumed that the printers 103 to 105 are compatible with the virtual printer driver held in the client PC 102.

Figure 15:
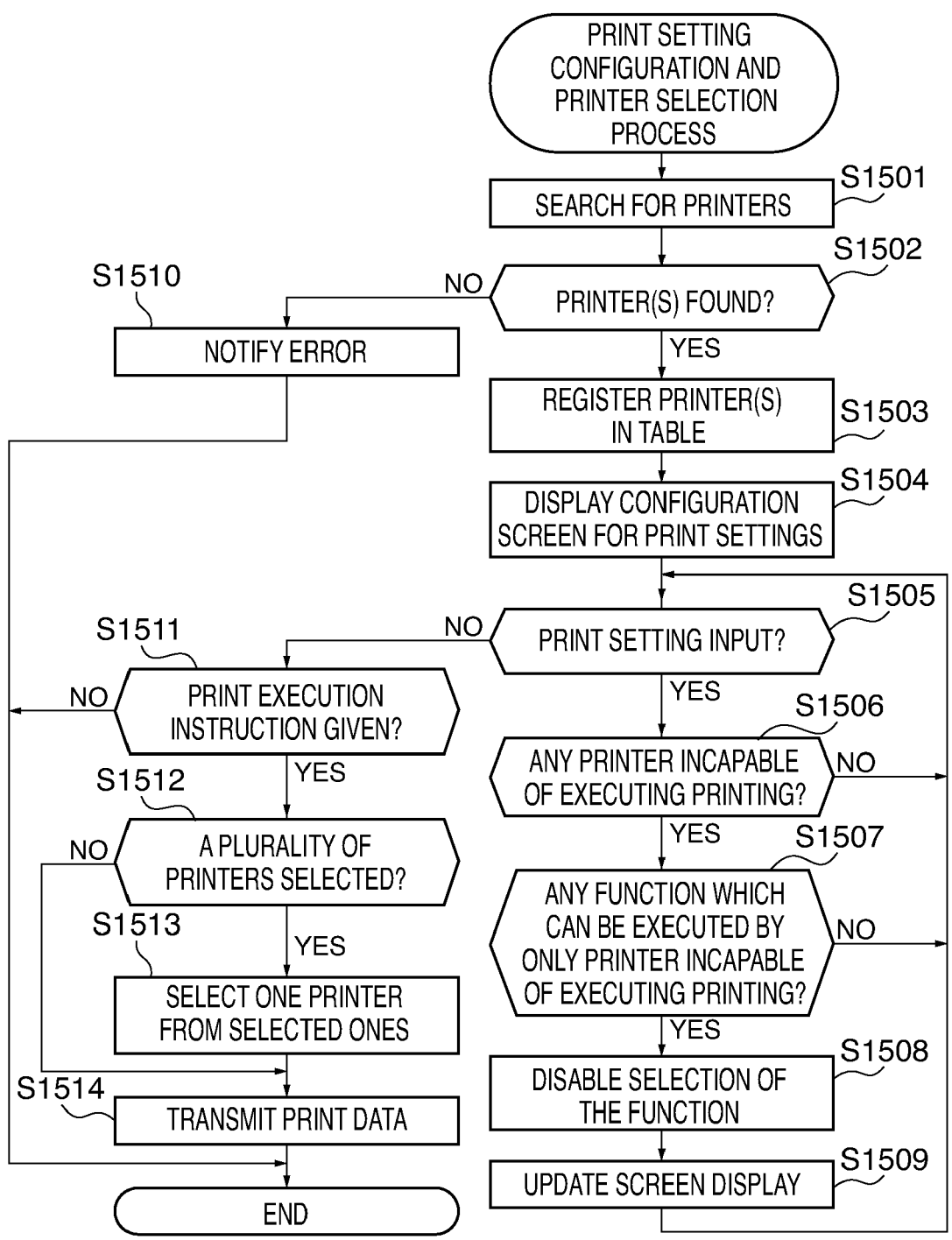
FIG. 15 is a flowchart of a print setting configuration and printer selection process which is executed by a virtual printer driver in the second embodiment.

A print setting configuration and printer selection process executed by the virtual printer driver installed in the client PC according to the second embodiment will be described with reference to FIG. 15. FIG. 15 is a flowchart of the print setting configuration and printer selection process as a sequence of operations from an operation for configuration of print settings to an operation for print data transmission, which is executed by the virtual printer driver.

When the client PC starts up the virtual printer driver in response to a user instruction, the print setting configuration and printer selection process in FIG. 15 is started.

In a step S1501, the virtual printer driver broadcasts a search request onto the network so as to search for printers compatible with the virtual printer driver. In a step S1502, it is determined whether or not any response to the search request transmitted in the step S1501 has been received. If one or more responses have been received, it is judged that there is/are a printer or printers compatible with the virtual printer driver on the network, and the process proceeds to a step S1503. If no response has been received, it is judged that there is no printer compatible with the virtual printer driver on the network, and hence the process proceeds to a step S1510. In the step S1510, a message to the effect that there is no such printer is displayed on a screen, followed by terminating the present process.

In the step S1503, an inquiry for printer information is issued to each printer found in the step S1502, and a printer function table shown in FIG. 14 is generated based on the printer information acquired as a response to the inquiry. The process may be configured such that the printer information is included in the response to the search request, which is received in the step S1502.

In a step S1504, the screen controller 402 of the virtual printer driver 400 displays a configuration screen for print settings based on the printer function table generated in the step S1503. Specifically, the screen shown in FIG. 7 by way of example is displayed on the client PC.

In a step S1505, it is determined whether or not a print setting has been input on the configuration of print settings screen. If a print setting has been input, the process proceeds to a step S1506. In the step S1506, it is determined by referring to the printer function table whether or not there is a printer which is incapable of performing a function associated with the input print setting. In the example in FIG. 14, when the "color printing" has been input as a print setting, the printer 104 is identified as a printer which is incapable of executing printing according to the input print setting. If it is determined in the step S1506 that there is no printer which is incapable of performing the function associated with the input print setting, the process returns to the step S1505, wherein a user input is awaited.

In a step S1507, it is determined whether or not there is any function which can be performed only by the printer identified in the step S1506. More specifically, it is determined whether or not functions executable by the identified printer include a function which cannot be performed by printers capable of executing printing according to the print setting input in the step S1505. Taking FIG. 14 as an example, when the "color printing" is input in the step S1505, the printer 104 is identified in the step S1506, based on the printer function table in FIG. 14. The printer 104 is capable of performing the double-sided printing function and the stapling function. The stapling function of the two functions cannot be performed by the printers 103 and 105 capable of color printing. In this case, therefore, the stapling function is identified in the step S1507.

If it is determined in the step S1507 that there is a function which can be performed only by the printer identified in the step S1506, the function is identified, and then the process proceeds to a step S1508. On the other hand, if there is no function which can be performed only by the printer identified in the step S1506, the process returns to the step S1505, wherein a user input is awaited.

In the step S1508, user input of a configuration item of a print setting associated with the function identified in the step S1507 is disabled on the configuration of print settings screen so as to inhibit designation of the print setting associated with the function identified in the step S1507. In a step S1509, the screen controller actually updates the display such that the configuration item of the associated print setting on the configuration screen is grayed out, and then the process returns to the step S1505.

In a step S1511, it is determined whether or not a print execution instruction has been given by the user on the configuration of print settings screen. If a print execution instruction has been given, the process proceeds to a step S1512. Processing executed in the step S1512 and the following steps is identical to that executed in the steps S1314 et seq. in FIG. 13.

As described above, according to the second embodiment, whenever a virtual printer driver is started up, printers compatible therewith are searched for, so that the user is not required to register available printers in advance in a client PC. Further, even when a new printer is added onto a network, it is possible to register the printer as a printer using the virtual printer driver, without the user carrying out a operation for registering the printer in the client PC. Furthermore, whenever a print setting is input by the user, control is performed such that a function executable only by a printer which is incapable of executing the input print setting cannot be input as a print setting. This makes it possible to eliminate the inconvenience that the user can only know that a function cannot be performed by a single printer, after the user has input an associated print setting and given a print execution instruction, which improves user operability.

Although in the above described embodiments, various configuration screens are displayed on the display 208 in FIG. 2 by the virtual printer driver 400 in FIG. 4, the same configuration of print settings as described above can be performed on the operation panel 308 in FIG. 3 as well. This means that the present invention is applicable not only to a case where print data is transmitted from a client PC to a printer on a network, but also to a case where an image processing apparatus on a network transmits data to another image processing apparatus on the network to cause the same to process the data.

The virtual printer driver 400 installed in the client PC implementing the information processing apparatus according to the present invention is equipped with a function as an acquisition unit for acquiring function information on each of a plurality of image processing apparatuses present on the network, and a function as a selection unit for selecting a desired one from the image processing apparatuses. Further, the virtual printer driver 400 is provided with a function as a display unit. The display unit displays configuration items associated with functions provided in the image processing apparatus selected by the selection unit, and configuration items associated with functions provided in the other image processing apparatuses than the image processing apparatus selected by the selection unit, in a manner selectable by the user. Furthermore, the virtual printer driver 400 is provided with a function as a display control unit. The display control unit displays the configuration items associated with the functions provided in the other image processing apparatuses than the image processing apparatus selected by the selection unit, such that an image processing apparatus equipped with a function associated with each of the configuration items can be identified by the user. The virtual printer driver 400 is also provided with a function as a transmission unit. The transmission unit transmits to one of the image processing apparatuses, data to be subjected to image processing based on a configuration item selected by the user from the configuration items displayed by the display unit.

Further, the virtual printer driver 400 installed in the client PC implementing the information processing apparatus according to the present invention is equipped with a function as a second selection unit. The second selection unit is configured to be operable when a configuration item associated with a function provided in the image processing apparatus(es) except the selected image processing apparatus is/are selected by the user, to select the image processing apparatus(es) equipped with the function associated with the configuration item, in place of the selected image processing apparatus.

Furthermore, the virtual printer driver 400 installed in the client PC implementing the information processing apparatus according to the present invention is equipped with a function as an identifying unit for identifying, from the image processing apparatuses, an image processing apparatus which is not provided with a function associated with a configuration item selected by the user from the configuration items displayed by the display unit. The virtual printer driver 400 also has a function as a second identifying unit for identifying a function which is provided in an image processing apparatus identified by the identifying unit, but not in an image processing apparatus equipped with a function associated with a configuration item selected by the user from the configuration items displayed by the display unit.

The display control unit displays configuration items displayed by the display unit and associated with functions provided in other image processing apparatuses than the image processing apparatus selected by the selection unit, together with the names of the associated image processing apparatuses.

It is to be understood that the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-108181 filed Apr. 17, 2007, which is hereby incorporated by reference herein in its entirety.

What is claimed is:

1. An information processing apparatus comprising:
    a selection unit configured to select an image processing apparatus from a plurality of image processing apparatuses; and
    a display unit configured to display an image processing configuration screen, which includes:
    (a) first configuration items associated with functions provided in the selected image processing apparatus, and
    (b) second configuration items associated with functions not provided in the selected image processing apparatus and provided in at least one non-selected image processing apparatus,
    wherein said display unit displays with the second configuration items, information indicating the at least one non-selected image processing apparatus in which the function associated with the second configuration items are provided.

2. An information processing apparatus as claimed in claim 1, further comprising:
    a second selection unit configured to be operable when a configuration item associated with a function provided in the at least one non-selected image processing apparatus is selected by the user, to select the image processing apparatus equipped with the function associated with the configuration item, in place of the selected image processing apparatus.

3. An information processing apparatus as claimed in claim 1, further comprising:
    a setting unit configured to set one of the displayed configuration items as a setting item of a print setting;
    a first identifying unit configured to identify from the plurality of image processing apparatuses, an image processing apparatus having a function associated with the configuration item set by said setting unit; and a second identifying unit configured to identify a function from the configuration items in the image processing configuration screen, a configuration item associated with a function not provided in the image processing apparatus identified by said first identifying unit; and a restricting unit configured to restrict the configuration item identified by said second identifying unit from setting as another setting item of the print setting.

4. An information processing apparatus as claimed in claim 1, wherein the information indicating the at least one non-selected image processing apparatus is a name of the at least one non-selected image processing apparatus.

5. An information processing apparatus as claimed in claim 1, wherein the information processing apparatus is a personal computer, and the image processing apparatuses are printers.

6. An information processing apparatus comprising:

a display unit configured to display an image processing configuration screen for setting functions to be executed by an image processing apparatus, wherein the image processing configuration screen includes:

(a) first configuration items for setting a first function provided in a first image processing apparatus and not provided in a second image processing apparatus;

(b) second configuration items for setting a second function not provided in the first image processing apparatus and provided in the second image processing apparatus, and (c) third configuration items for setting a third function provided in both the first image processing apparatus and the second image processing apparatus; and a control unit configured to control display information indicating that setting the third function is permitted and setting the second function is restricted, when the first function is set.

7. An information processing apparatus as claimed in claim 6, wherein the information processing apparatus is a personal computer, and the first image processing apparatus and the second image processing apparatus are printers.

8. A method of controlling an information processing apparatus, the method comprising:

a selection step of selecting an image processing apparatus from a plurality of image processing apparatuses; and a display step of displaying, on a display unit, an image processing configuration screen, which includes:

(a) first configuration items associated with functions provided in the selected image processing apparatus, and (b) second configuration items associated with functions not provided in the selected image processing apparatus and provided in at least one non-selected image processing apparatus;

wherein said display step displays, on the display unit, with the second configuration items, information indicating the at least one non-selected image processing apparatus in which the functions associated with the second configuration items are provided.

9. A method as claimed in claim 8, further comprising:

a second selection step of selecting, when a configuration item associated with a function provided in the at least one non-selected image processing apparatus is selected by the user, the image processing apparatus equipped with the function associated with the configuration item, in place of the selected image processing apparatus.

10. A method as claimed in claim 8, further comprising:

a setting step of setting one of the displayed configuration items as a setting item of a print setting;

a first identifying step of identifying from the plurality of image processing apparatuses, an image processing apparatus having a function associated with the configuration item set in said setting step;

a second identifying step of identifying a function from the configuration items in the image processing configuration screen, a configuration item associated with a function not provided in the image processing apparatus identified in said first identifying step; and a restricting step of restricting the configuration item identified in said second identifying step from being set as another setting item of the print setting.

11. A method as claimed in claim 8, wherein the information indicating the at least one non-selected image processing apparatus is a name of the at least one non-selected image processing apparatus.

12. A method as claimed in claim 8, wherein the information processing apparatus is a personal computer, and the image processing apparatuses are printers.

13. A method of controlling an information processing apparatus, the method comprising:

a display step of displaying, on a display unit, an image processing configuration screen for setting functions to be executed by an image processing apparatus, wherein the image processing configuration screen includes:

(a) first configuration items for setting a first function provided in a first image processing apparatus and not provided in a second image processing apparatus, (b) second configuration items for setting a second function not provided in the first image processing apparatus and provided in the second image processing apparatus, and (c) third configuration items for setting a third function provided in both the first image processing apparatus and the second image processing apparatus; and a control step of controlling display information indicating that setting the third function is permitted and setting the second function is restricted, when the first function is set.

14. A method as claimed in claim 13, wherein the information processing apparatus is a personal computer, and the first image processing apparatus and the second image processing apparatus are printers.

15. A non-transitory computer-readable storage medium storing a computer program executable by a computer to execute a method of controlling an information processing apparatus, the computer program comprising:

a selection module for selecting an image processing apparatus from a plurality of image processing apparatuses; and a display module for displaying, on a display unit, an image processing configuration screen, which includes:

(a) first configuration items associated with functions provided in the selected image processing apparatus, and (b) second configuration items associated with functions not provided in the selected image processing apparatus and provided in at least one non-selected image processing apparatus, wherein said display module displays, on the display unit, with the second configuration items, information indicating the at least one non-selected image processing apparatus in which the functions associated with the second configuration items are provided.

16. An information processing apparatus as claimed in claim 6, wherein said control unit controls to display information indicating that setting both the first function and the second function are permitted, when the third function is set.

17. An information processing apparatus as claimed in claim 6, wherein said control unit grays out the second configuration items for setting the second function, when the first function is set.

* * * * *